Patented Mar. 30, 1926.

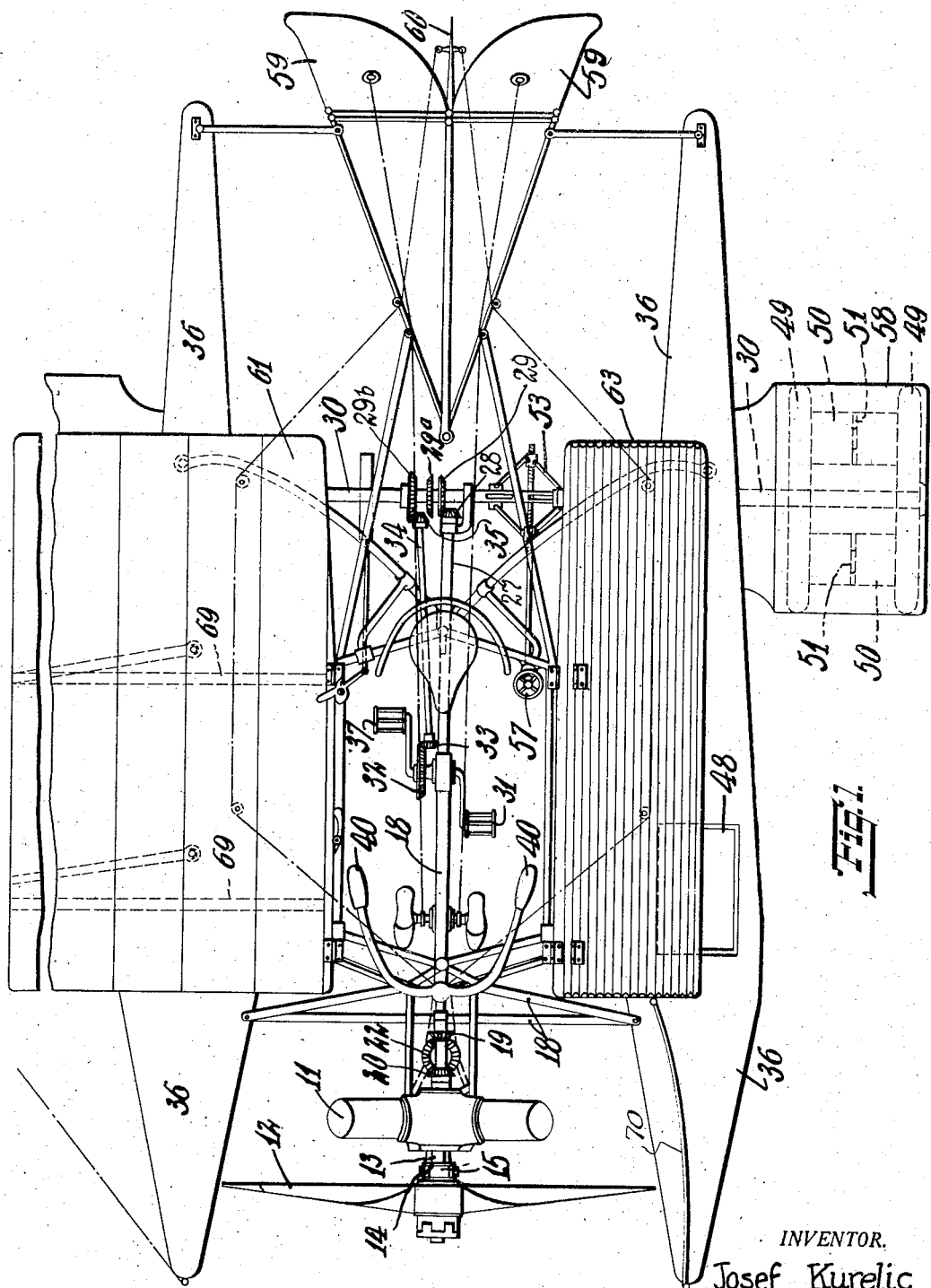

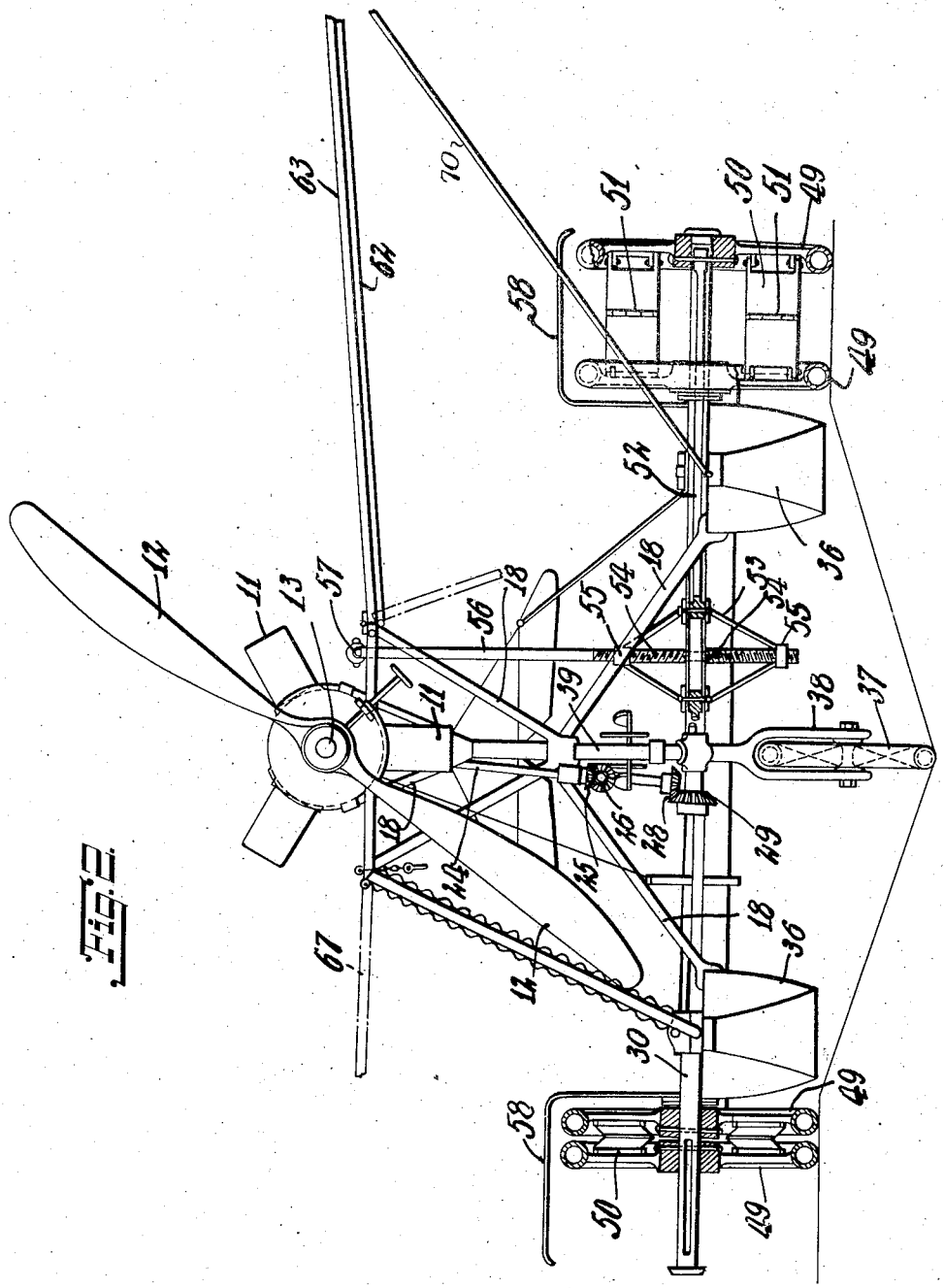

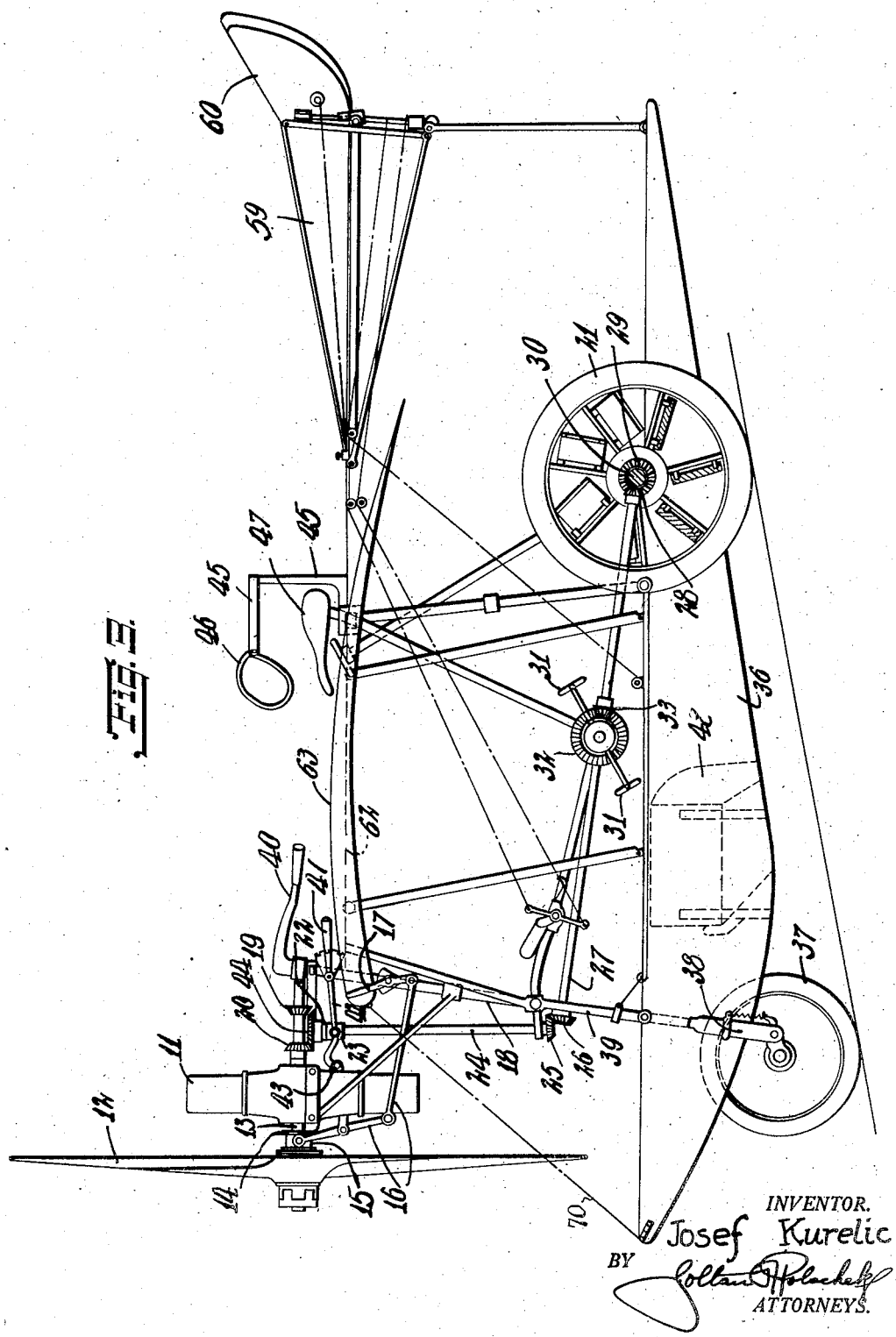

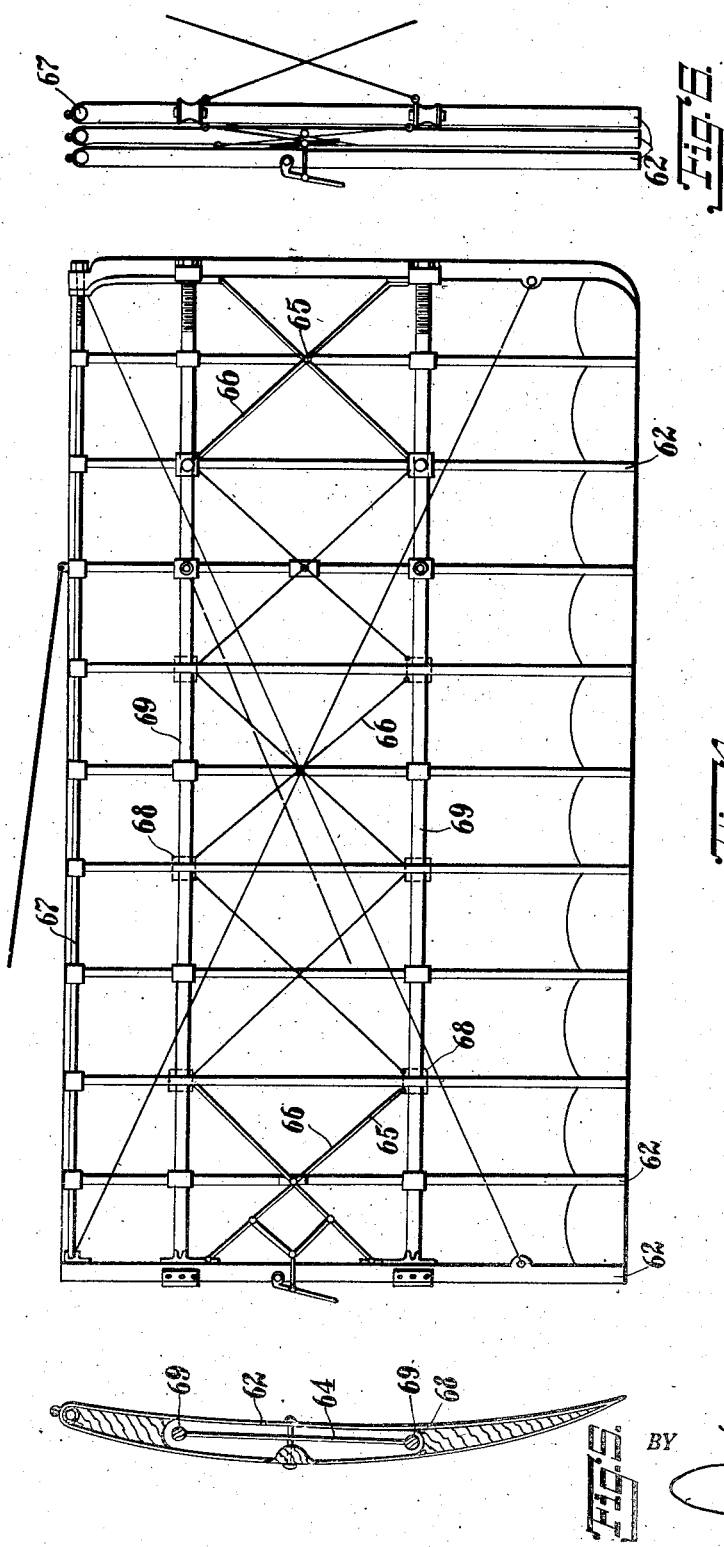

1,578,740

UNITED STATES PATENT OFFICE.

JOSEF KURELIC, OF NEW YORK, N. Y.

MOTOR-CYCLE HYDROPLANE.

Application filed March 12, 1925. Serial No. 14,867.

*To all whom it may concern:*

Be it known that I, JOSEF KURELIC, a subject of the King of Italy, residing at New York, in the county of New York and State of New York, have invented certain new and useful Improvements in Motor-Cycle Hydroplanes, of which the following is a specification.

This invention relates to improvements in a combination motorcycle and hydroplane, which are convertible into one another, a modification of which is shown in the accompanying drawings.

One of the objects of my invention is to produce an improved combination motorcycle and hydroplane, in which the wings of planes of the hydroplane may be folded up and the motorcycle driven by the reaction or thrust of the propeller of the hydroplane.
Another object of my invention is to provide the hydroplane of my combination paddle wheels with collapsible blades, which could be employed also as wheels to run on land.
A further object of my invention is to adapt my motorcycle to be driven by foot power, if desired, as well as by power from the engine, if desired, without operating the propeller.
Other objects and advantages will hereinafter appear.

I attain these objects by the combination motorcycle and hydroplane illustrated in the accompanying drawings or by any mechanical equivalent or obvious modifications of the same.

In the drawings Fig. 1 is a plan view of my combination motorcycle and hydroplane, showing one of the wings of the hydroplane as collapsed or folded up and the other wing as partly broken away, also showing one of the paddle wheels with the paddles or blades thereof extended, ready for use on water.

Fig. 2 is a front view of my combination motorcycle and hydroplane, showing one side thereof with the wing or plane collapsed or folded up and the side wheel with its paddles folded up, for use on land and the other side thereof with its wing or plane extended, and the side wheel with its paddles extended for use on water.

Fig. 3 is a side elevation of my combination motorcycle and hydroplane showing the side wheels with some of their paddles collapsed and others extended.

Fig. 4 is a plan view illustrating the construction in detail of the wings or planes of my hydroplane.

Fig. 5 is a detail of the ribs employed in the said wings of my hydroplane.

Fig. 6 is a similar view to Fig. 4 showing the wings or planes in collapsed position.

Numeral 11 designates the engine of my combination motorcycle-hydroplane and 12 the propeller, which I prefer to have loosely swivelled on the shaft 13 of the engine and operated by means of a clutch 14, which may be moved into and out of engagement with said propeller by means of a sleeve 15, the link work 16 and the lever or handle 17.

The said lever 17 is shown in Fig. 3 as pivotally connected to the permanent frame 18 of my combination motorcycle and hydroplane.

The rear end of the shaft 13 is shown in Fig. 2 as having slidably mounted thereon the bevel gears 19 and 20 for driving my motorcycle hydroplane forward and rearward respectively; the motion from said gears 19 and 20 is shown in Fig. 3 as transmitted to the rear wheels 21 by means of the gear 22, which is carried by a sleeve 23 on the upper end of a vertical shaft 24, the gear 25 at the lower end of the same shaft 24, the gear 26, in mesh with the gear 25, the substantially horizontal shaft 27, which carries said gear 26 at the forward end thereof, the gear 28 at the rear end of the shaft 27 and the gear 29 on the wheel axle 30.

My motorcycle may also be run by foot power when the sleeve 23 is moved downwardly with the gear 22 out of mesh with the gears 19 and 20, and the wheel axle 30 is then propelled by means of the foot pedals 31, and the motion transmitted therefrom to the said wheel axle 30 by means of the gear 32, the gear 33, which is shown in Fig. 1 as being in mesh with said gear 32, the auxiliary shaft 34, which carries said gear 33 at the forward end thereof, the gear 35 at the rear end of said shaft 34, which gear 35 is shown in Fig. 1 as being in mesh with $29^b$ one of the pair of gears on the wheel axle 30 for reversing the said axle 30; the other of the pair of gears $29^b$ may be slid into mesh with said gear 35 for driving the said axle 30 forward by means of the pedals 31.

The frame 18 of my combination motorcycle and hydroplane is connected at the lower end thereof to a pair of floats 36, and it carries a front steering wheel 37 by means of the fork 38 at the lower end of the steering rod 39, which is pivotally connected to said frame 18 and terminates at the upper end thereof in the handle bars 40.

The front part of the frame 18 has also pivotally connected thereto the rear end 41 of the lever 42, which is pivotally connected to the engine at 43 and to the sleeve 23 at 44 for shifting the latter on the shaft 24 as is hereinbefore described.

The top of the frame 18 is provided with the backing 45, which has connected thereto the flexible strap 46, for securing the operator in the seat 47, as shown in Fig. 3.

A tank of gasoline 48 is shown in Figs. 1 and 3 as situated in one of the floats 36.

The side wheels 21 of my motorcycle-hydroplane are shown in Figs. 1 and 2 as consisting each of two component wheels 49, which have the hinged paddles 50 connected therebetween.

Each of said paddles 50 consists of two plates connected to each other by means of the hinges 51.

The outer one of each of said component wheels 49 on each side of my motorcycle-hydroplane is connected by means of a rod 52 to a double toggle joint mechanism 53 which is shown in Figs. 1 and 2 on the left side of my motorcycle-hydroplane (looking forward in the drawings); a similar mechanism may be placed also on the other side of my motorcycle-hydroplane if desired.

Said toggle joint mechanism 53 may be extended or disextended horizontally by means of the right and left screw 54, which passes through nuts 55 at the upper and lower ends of said toggle joint mechanism.

Said screw 54 is formed at the lower end of a rod 56, which is pivotally connected to the frame 18 and also has secured thereto at the upper end thereof the hand wheel 57.

When the said toggle joint mechanism is extended, the outer component wheels 49 are moved outwardly on the axle 30 thereof, thereby causing the hinged paddles 50 to unfold each into a radial plane, for use in propelling the hydroplane in water; and, vice versa, when the said toggle joint mechanism is disextended, the outer component wheels 49 are moved inwardly, thereby causing the paddles 50 to fold up on their hinges into planes parallel to said wheels 49; the wheels may then be run on land. Mud and spray shields 58 may be provided over said wheels 21, as shown in Figs. 1 and 2; the shields 58 may be connected to the floats 36 on the outer side thereof.

The rear of the frame 18 may have connected thereto horizontal rudders 59 and a vertical rudder 60, as shown in Figs. 1 and 3.

The wings 61 of my hydroplane are shown in Figs. 4 and 5 as consisting each of a number of curved ribs 62 over which the fabric 63 of the wings may be spread and connected to each of said ribs by any suitable method.

The ribs 62 of each wing 61 have therein openings 64, through which a lazy tongue mechanism 65, passes, the bars 66 of said mechanism being connected to all of said ribs 62, whereby said ribs may be moved together and towards the inner end of the wing 61, thereby folding up the fabric 63 therebetween or they may be moved apart and away from the inner end of the wing 61, thereby spreading out the fabric 63 thereon.

Each of the wings 61 may be pivotally connected to the frame 18, whereby the wings when collapsed may be inclined into a position as shown in Fig. 2.

To stiffen the wings laterally I provide the bar 67 over which the ribs 62 may slide by means of suitable eyes 68 at the front ends of said ribs 62.

The ends of the lazy tongue bars 66 are also connected to sleeves 68, which slide on rods 69.

The ribs 62 with the fabric 63 and the lazy tongue frame 65 when collapsed may be removed from said bars 67 and 69 and placed into the position shown in Fig. 2, and said bars 67 and 69 may be placed lengthwise the frame 18, if desired.

Suitable cords and levers may be provided in said frame 18 within reach of the operator, as shown in the drawing, whereby to manipulate the rudders 59 and 60 and the lazy tongue frame 65. Cords 70 are also used as guys for the wings when the latter are extended.

Having thus described my invention what I claim as new and desire to protect by Letters Patent of the United States is as follows:—

1. In a motorcycle an engine, an engine shaft, a plurality of drive wheels, a detachable means for transmitting motion from the engine to said wheels and a detachable foot pedal drive for said wheels, said transmitting means containing a pair of gears slidably mounted on said shaft, a shift gear to be moved into and out of mesh with said shaft gears and a means for controlling the position of said shift gear for connecting the engine shaft to said drive wheels when said foot pedal drive is disconnected therefrom and vice versa.

2. In a combination motorcycle and hydroplane, an engine, an engine shaft, a propeller, one or more floats, a plurality of wings, a plurality of drive wheels, collapsible paddles on said drive wheels for use on water, a detachable means for transmitting motion from the said engine shaft to said wheels and a means for extending and collapsing the paddles in said wheels.

3. In a combination motorcycle and hydroplane, an engine, an engine shaft, a propeller, a plurality of floats, a plurality of wings, one or more drive wheels, collapsible paddles on said wheels for use on water, a detachable means for transmitting motion from said shaft to said wheels and a toggle-joint mechanism for extending and collapsing the paddles on said wheels.

4. In a combination motorcycle and aeroplane, an engine, a propeller, an engine shaft, a plurality of drive wheels, a detachable means for transmitting motion from said shaft to said wheels and a plurality of collapsible wings, said wings comprising a fabric covering, cross ribs for connecting said fabric thereto, openings in said cross ribs, a lazy tongue mechanism located in said openings lengthwise said wings, for collapsing said ribs and guide rods for said ribs to slide thereon when being collapsed, said rods being detachably connected to said ribs.

In testimony whereof I have affixed my signature.

JOSEF KURELIC.